(12) United States Patent
Fischer (10) Patent No.: US 11,061,112 B2
(45) Date of Patent: Jul. 13, 2021

(54) METHOD FOR MONITORING THE PERFORMANCE RANGE OF AN AUTOMOTIVE RADAR SYSTEM

(71) Applicant: Aptiv Technologies Limited, St. Michael (BB)

(72) Inventor: Thomas Fischer, Wenden (DE)

(73) Assignee: Aptiv Technologies Limited, St. Michael (BB)

( * ) Notice: Subject to any disclaimer, the term of this patent is extended or adjusted under 35 U.S.C. 154(b) by 224 days.

(21) Appl. No.: 16/131,113

(22) Filed: Sep. 14, 2018

(65) Prior Publication Data

US 2019/0094338 A1 Mar. 28, 2019

(30) Foreign Application Priority Data

Sep. 25, 2017 (EP) ..................................... 17192829

(51) Int. Cl.
*G01S 7/40* (2006.01)
*G01S 13/931* (2020.01)
*G01S 13/26* (2006.01)

(52) U.S. Cl.
CPC .............. *G01S 7/4021* (2013.01); *G01S 7/40* (2013.01); *G01S 13/26* (2013.01); *G01S 13/931* (2013.01); *G01S 2007/4039* (2013.01); *G01S 2007/4078* (2013.01); *G01S 2013/93275* (2020.01)

(58) Field of Classification Search
CPC .......... G01S 7/4021; G01S 7/40; G01S 13/26; G01S 13/931; G01S 2013/93275; G01S 2007/4039

USPC ........................................... 342/174, 70, 104
See application file for complete search history.

(56) References Cited

U.S. PATENT DOCUMENTS

| 6,147,638 A * | 11/2000 | Rohling ................... G01S 13/28 342/104 |
| 2002/0163463 A1* | 11/2002 | Lajiness ................ G01S 7/4004 342/70 |
| 2009/0243912 A1* | 10/2009 | Lohmeier ............. G01S 13/931 342/70 |

(Continued)

FOREIGN PATENT DOCUMENTS

| DE | 10 2004 024695 A1 | 12/2005 |
| DE | 10 2013 219391 A1 | 3/2015 |

(Continued)

OTHER PUBLICATIONS

"Foreign Office Action", European Application No. 17192829.4, dated Dec. 22, 2020, 4 pages.

*Primary Examiner* — Bo Fan
(74) *Attorney, Agent, or Firm* — Colby Nipper PLLC (57) ABSTRACT

A method for monitoring the performance range of a radar system placed behind a portion of a vehicle including, in an operational mode, the steps of: transmitting a first signal in a high range resolution mode from the radar system through the portion of the vehicle; receiving a first return signal comprising a part of the first signal that is reflected by the portion of the vehicle at the radar system; measuring the first return signal; comparing the first return signal with a calibration return signal representative of a part of the first signal that is reflected by the portion of the vehicle in a calibration mode; determining the relative loss of transmission of the portion of the vehicle from the comparing step.

20 Claims, 5 Drawing Sheets

(56) References Cited

U.S. PATENT DOCUMENTS

2014/0334830 A1* 11/2014 Pierrottet .............. G01S 7/4911
                                                                               398/187
2015/0309165 A1   10/2015 Elwart et al.
2017/0363711 A1* 12/2017 Rao ........................ G01S 13/34
2018/0062768 A1*  3/2018 Frank ................... H04B 15/005

FOREIGN PATENT DOCUMENTS

DE       102013219391 A1 *  3/2015  ........... G01S 7/4004
EP          2 980 993 A1    2/2016

* cited by examiner

METHOD FOR MONITORING THE PERFORMANCE RANGE OF AN AUTOMOTIVE RADAR SYSTEM

TECHNICAL FIELD OF INVENTION

The present invention relates to a method for monitoring the performance range of an automotive radar system and more particularly to determine the relative transmission loss of a portion of the vehicle which is passed through by a radar signal of the radar system.

BACKGROUND OF INVENTION

Generally, radar systems are widely used for sensing of the environment around vehicles up to 360° around the vehicle. This radar system is typically mounted behind the bumper/fascia. The individual paintings affect radars ability to look through the bumper. Currently no system is available that actively monitors the dampening of the fascia meaning that the actual field of view (especially the rang) can be degraded without a diagnostic. The state of the art approach to deal with this issue, also called blockage or partial blockage, is using statistics of applied to the data the radars generating from the environment. If a radar system constantly shows targets only up to a certain limited range, a blockage might be the reason. This method is of course strongly depended on the driving environment and does not guarantee that blockage is detected within a given time even more critical is very susceptible to false alerts, i.e. when driving in desert or snow.

SUMMARY OF THE INVENTION

According to a preferred embodiment, a method for monitoring the performance range of a radar system placed behind a portion of a vehicle includes, in an operational mode, the steps of: transmitting a first signal in a high range resolution mode from the radar system through the portion of the vehicle; receiving a first return signal comprising a part of the first signal that is reflected by the portion of the vehicle at the radar system; measuring the first return signal; comparing the first return signal with a calibration return signal representative of a part of the first signal that is reflected by the portion of the vehicle in a calibration mode; and determining the relative loss of transmission of the portion of the vehicle from the comparing step.

The step of measuring the first return signal may comprise a step of measuring the first n range bins from the first return signal up to a predetermined maximum distance of the portion of the vehicle from the radar system; and the step of comparing may comprise a step of comparing the first n range bins with the predetermined first n range bins of the calibration return signal. 'n' may be in the interval [1-10].

The step of comparing may comprise comparing the amplitudes of the first return signal with the amplitudes of the calibration return signal.

The method may further comprise, after determining the relative loss, a step of triggering an alert in the vehicle if the relative loss of transmission has increased more than a predetermined relative loss of transmission threshold, said threshold corresponding to a minimum guaranteed detection range performance of the radar system placed behind the portion of the vehicle.

The operational mode may be initiated at each power up of the vehicle. The high range resolution mode may include generating the first signal using ultra-wide band modulation. The first signal may be chirp ramp. The chirp ramp may be a chirp ramp of 4 GHz. The first signal may be a frequency modulated radio waves signal in the radar band. The radar band may be the [77 GHz-81 GHz] radar band.

The calibration mode may comprise the steps of: transmitting a test signal, comprising an object detection signal, from the radar system through the portion of the vehicle toward a predetermined object placed at a predetermined distance from the vehicle; receiving a test return signal comprising a part of the test signal that is reflected by the predetermined object at the radar system; analyzing the test return signal; determining if the predetermined object is detected according to the analyzing step; transmitting the first signal in a high range resolution mode from the radar system through the portion of the vehicle if the predetermined object has been detected; receiving the calibration return signal representative of a part of the first signal that is reflected by the portion of the vehicle at the radar system; and storing the calibration return signal.

The test signal may be a chirp ramp. The chirp ramp is a chirp ramp up to 400 MHz. The test signal may be a frequency modulated radio waves signal in the radar band.

According to a preferred embodiment, a radar system placed behind a portion of a vehicle and configured to detect an object in the outside environment of the vehicle, comprises: an antenna configured to detect a reflected signal characterized as a reflection of an emitted signal reflected by the object present in a field-of-view of the antenna; and a controller configured to: transmit a first signal in a high range resolution mode from the radar system through the portion of the vehicle; receive a first return signal comprising a part of the first signal that is reflected by the portion of the vehicle at the radar system; measure the first return signal; compare the first return signal with a calibration return signal representative of a part of the first signal that is reflected by the portion of the vehicle in a calibration mode; and determine the relative loss of transmission of the portion of the vehicle.

Further features and advantages will appear more clearly on a reading of the following detailed description of the preferred embodiment, which is given by way of non-limiting example only and with reference to the accompanying drawings.

BRIEF DESCRIPTION OF DRAWINGS

Other features, objects and advantages of the invention will become apparent from reading the detailed description that follows, and the attached drawings, given by way of example and in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
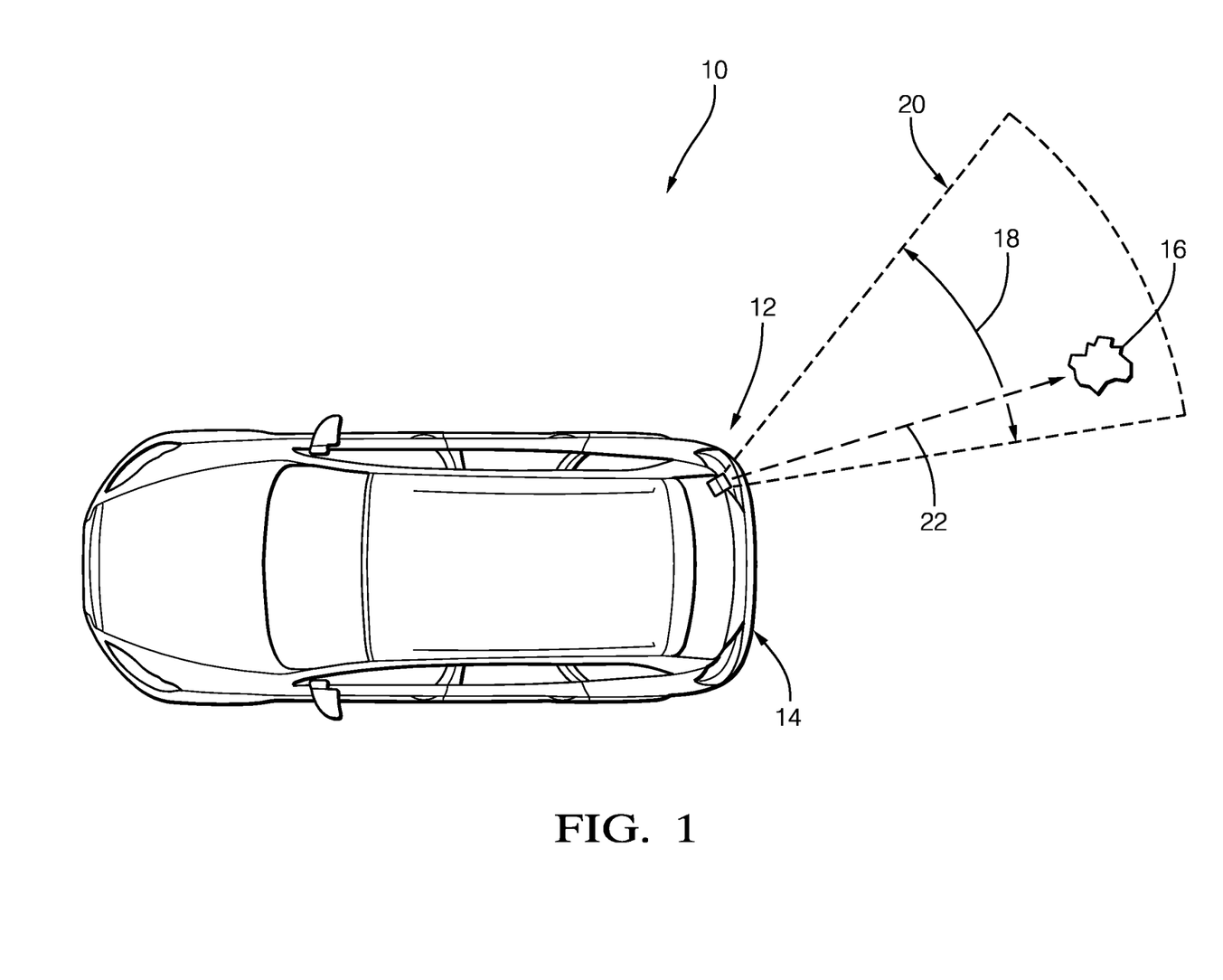
FIG. 1 is a schematic view of a vehicle equipped with a radar system placed behind the rear bumper and detecting a predetermined object outside the vehicle according to one embodiment.

FIG. 1 illustrates a non-limiting example of a vehicle 10 equipped with a radar system 12. In this non-limiting example, the radar system 12 is illustrated as being located behind the rear bumper 14, at the rear right corner of the vehicle 12. The radar system 12 is acting as side radar or corner radar. The radar system 12 is generally configured to detect one or more objects 16 relative to the vehicle 12.

In operational mode, the radar system 12 is operating in an object 16 detection mode that may include mid-range object detection mode or long range object detection mode. Mid-range object detection mode may be characterized as a detection of the object 16 for maximum range detection up to a hundred meter, as per example 80 meters. Mid-range object detection mode may be characterized as a mode wherein the field of view 18 of the radar beam 20 is a medium field of view, as per example in the order of +/−45 degrees. Mid-range object detection mode may be characterized has permitted a range resolution in the order of some ten centimeters as per example 60 centimeters. Long range object detection mode may be characterized as a detection of the object 16 for maximum range detection of several hundred meters. Long range object detection mode may be characterized as a mode wherein the field of view 18 of the radar beam 20 is a narrow field of view, as per example in the order of +/−10 degrees. Long-range object detection mode may be characterized has permitted a range resolution in the order of one or two meters, as per example 1.5 meters.

The object detection mode includes an object detection signal 22 that is transmitted toward the object 16 and partially reflected by the object 16. The object detection signal 22 is a radio waves signal in the radar band and more particularly is a frequency modulated radar signal in the Gigahertz (GHz) band of [77 GHz-81 GHz].

According to that example, the radar system 12 helps make drivers aware of approaching vehicles when changing lanes or making turns. Providing an alert when a vehicle has entered a blind spot to the rear or side of the vehicle 10, the radar system 12 helps give drivers more time to react to obstacles that may be difficult to see in the side mirror. This is also very useful for cross traffic alert and autonomous driving.

Targets of interest for these applications include on-road moving vehicles, including passenger cars, trucks, motorcycles and vulnerable road users such as bicyclists, pedestrians pushing shopping carts, etc.

Additionally, the system may have further capabilities to estimate the parameters of the detected object including, for example, the object position and velocity vectors, target size, and classification, e.g., vehicle verses pedestrian.

While an automobile is illustrated, it is contemplated that the system is also suitable for use on other vehicles such as heavy duty on-road vehicles like semi-tractor-trailers, and off-road vehicles such as construction equipment.

Figure 2:
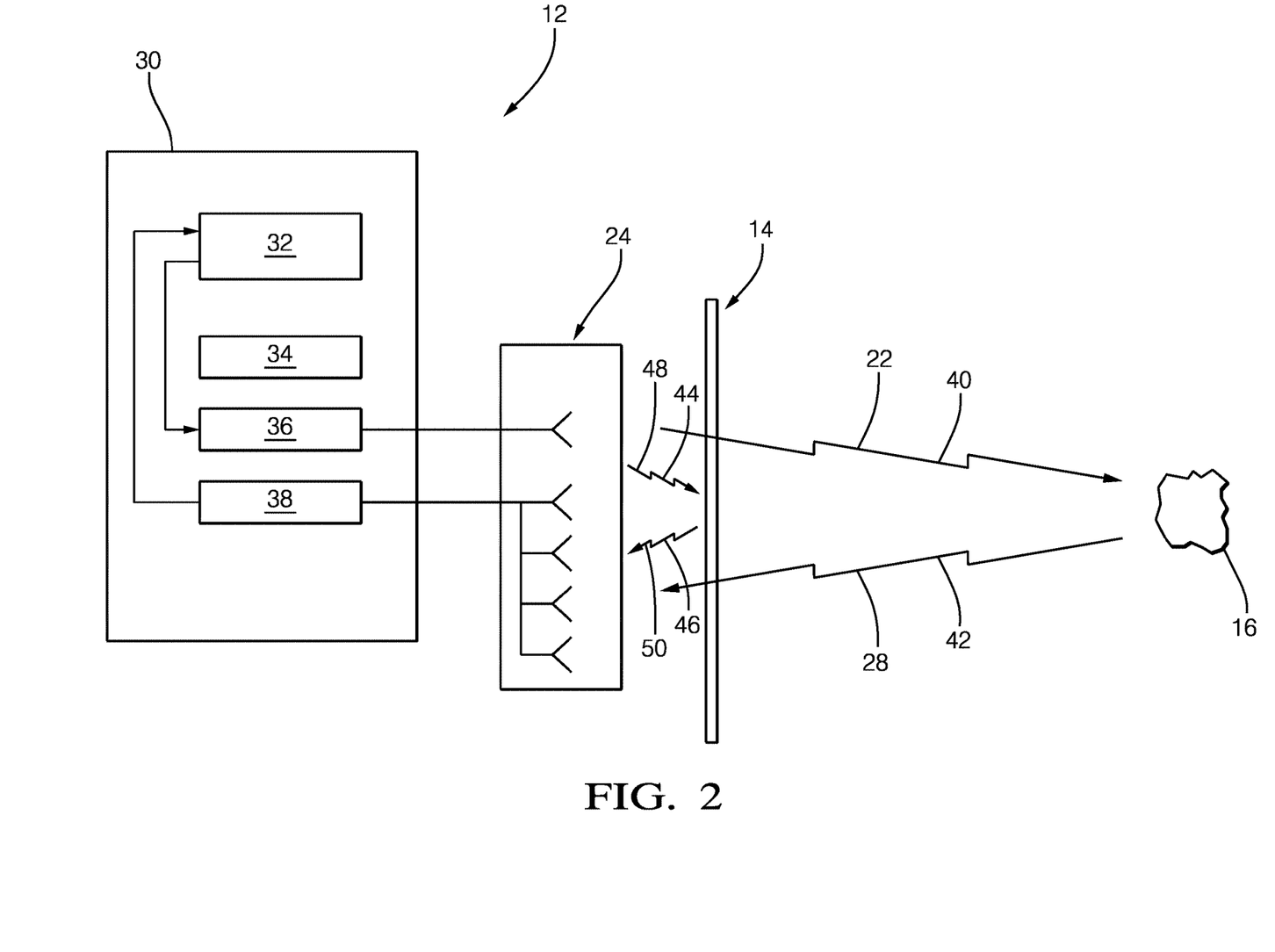
FIG. 2 is a schematic diagram of the radar system placed behind the rear bumper and detecting a predetermined object according to the embodiment of FIG. 1.

FIG. 2 further illustrates non-limiting details of the radar system. The radar system 12 includes an antenna 24 configured to emit the object detection signal 22 and to detect a return signal 28 characterized as a reflection of the object detection signal 22 reflected by the object 16 in the field-of-view 18 of the antenna 24.

The radar system 12 includes a controller 30. The controller 30 may include a processor 32 such as a microprocessor or other control circuitry such as analog and/or digital control circuitry including an application specific integrated circuit (ASIC) for processing data as should be evident to those in the art. The controller 30 may include memory 34, including volatile memory such as SDRAM, and or including non-volatile memory such as electrically erasable programmable read-only memory (EEPROM) for storing one or more routines, thresholds and captured data. The one or more routines may be executed by the processor 32 to perform steps for determining if signals received by the controller 30 indicate the presence of any object 16 in the field-of-view 18. The controller 30 may also include a transmitter 36 and a receiver 38 for coupling the antenna 24 to the processor 32 as will be recognized by those in the art.

As described above, the controller 30 is equipped with memory 34 for storing data such as samples of signals output by the receiver 38 which corresponds to the return signal 28. As such, the controller 30, or more specifically the processor 32, is configured to receive a time-domain signal representative of the return signal 28 detected by the antenna 24. The receiver 38 may include amplifiers and filters to condition the return signal 28 from the antenna 24 to be suitable for the processor 32. The processor 32 may include an analog to digital converter or ADC (not shown) configured to sample the time-domain signal.

Accordingly, the radar system 12 is able to be configured in the operational mode and in a calibration mode.

According to a preferred embodiment, the calibration mode is a mode that is preferably initiated at end of line of the vehicle assembly factory. The calibration mode consists of testing the ability of the radar system 12 placed in its environment, e.g. behind the rear bumper 14 of the vehicle 10, of detecting a predetermined object 16 at a predetermined distance range of the vehicle 10. In case that test is successfully passed, a characteristic of the portion of the vehicle through which the object detection signal 22 has been passed through is stored in the memory 34 of the radar system 12.

More particularly, the calibration mode consists of detecting a predetermined object 16 representative of a motorbike at a distance about 80 meters from the rear bumper 14 of the vehicle 10, said motorbike being placed on an adjacent lane of a current lane of the vehicle 10. The radar system 12 is transmitting a test signal 40 including the object detection signal 22 toward the predetermined object 16 being representative of a motorbike, i.e. an object emulating a radar cross section of five dBsm. The part of the emitted test signal 40 reflected onto the predetermined object 16 is a test return signal 42. The test return signal 42 is then analyzed by the controller 30 in order to verify if the predetermined object 16 has been correctly detected.

In case the predetermined object 16 has been correctly detected at the predetermined distance, i.e. 80 meters, a calibration signal 44 in a high resolution mode is emitted from the radar system 12. The calibration signal 44 in a high resolution mode permits of the radar system 12 to acquire a rear bumper 14 radar signature or a bumper radar pattern as a calibration return signal 46 representative of a part of the calibration signal 44 that is reflected by the portion of the vehicle in the calibration mode. The calibration return signal 46 is then stored in the memory 34 of the radar system 12.

In opposition to the object detection mode that comprises mid-range or long range object detection, the calibration signal 44 in a high range resolution mode or a high-resolution mode is a radio waves signal that permits a resolution range of few centimeters, as per example 3.7 centimeters. The calibration signal 44 in a high-resolution mode may be characterized as a signal that permits a detection of any object for maximum range detection up to few tenths of centimeter. The calibration signal 44 in a high-resolution mode may be characterized as a mode wherein the field of view 18 of the radar beam 20 is wide, as per example in the order of +/−75 degrees.

According to the preferred embodiment, in operational mode, in addition to the object 16 detection mode, preferably, prior to the operation of the radar system 12 in object detection mode, the radar system 12 is emitting a first signal 48 in the high-resolution mode that has the same characteristics as the calibration signal 44 emitted in the high-resolution mode during the calibration mode. More particularly, the first signal 48 may be emitted at each power up of the vehicle 10. A first return signal 50, that is representative of a part of the first signal 48 reflected by the rear bumper 14, is received by the receiver 38 of the radar system 12, processed by the processor 32 and then compared with the stored calibration return signal 46 such that the radar system 12 is able to determine a relative change of the transmission loss of the rear bumper 14 that is passed through by the object detection signal 22.

Determining the relative transmission loss of the rear bumper 14 is a way to evaluate if the radar system 12 placed behind the rear bumper 14 may still have the capability of detecting the predetermined object 16 placed at 80 meters during the calibration mode. If the relative transmission loss is too high, i.e. greater than a predetermined relative transmission loss threshold, then the radar system 12 may be able to trigger an alert to a driver of the vehicle 10 such that the driver is inform on a major failure of the radar system 12 performances.

As non-limiting examples, the rise of the transmission loss may be due to individual painting of the rear bumper 14 with metallic paint, or damages of the rear bumper 14 by a road accident, or changed of the original rear bumper 14 by chrome-plated rear bumper.

Figure 3:
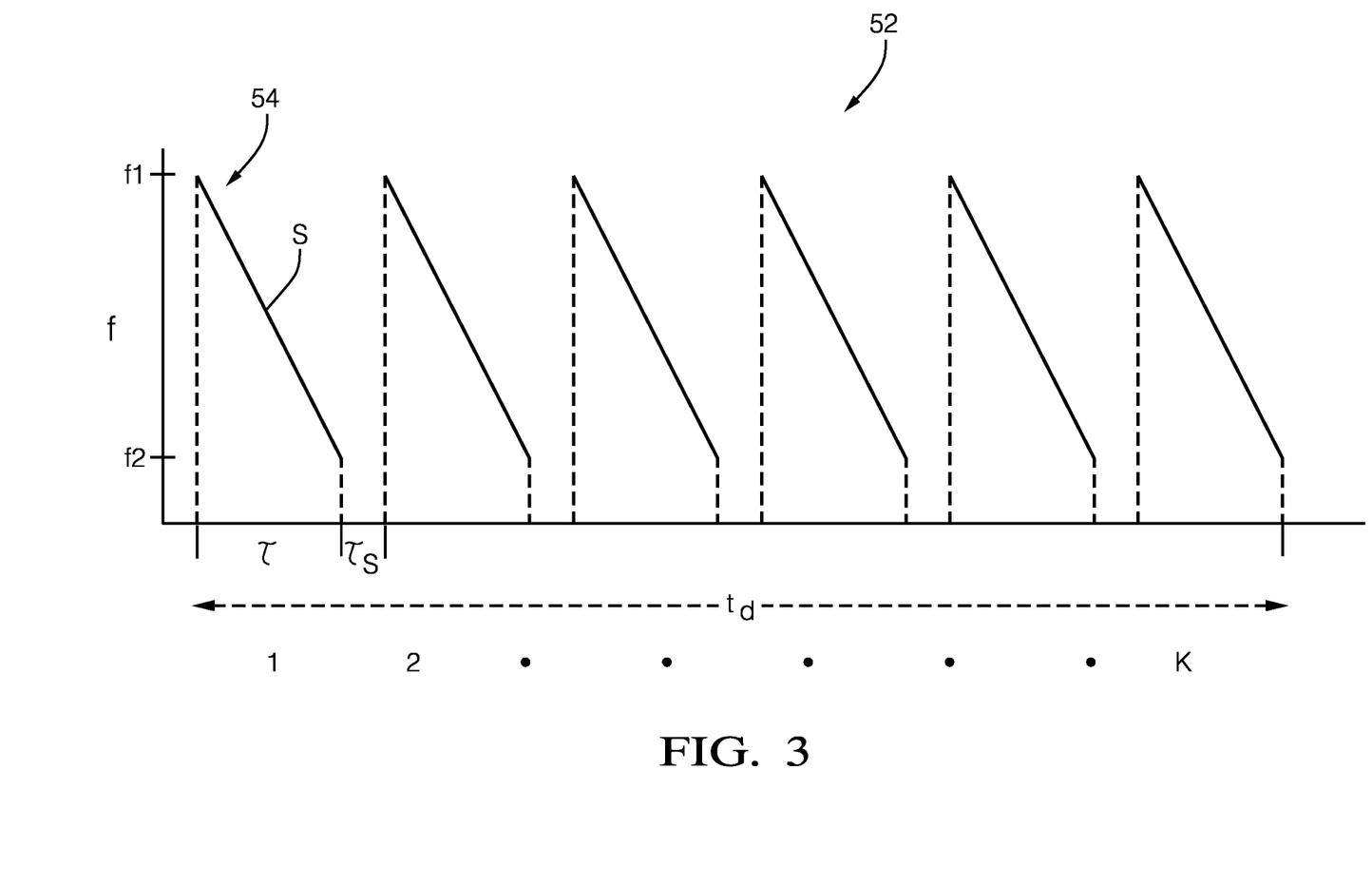
FIG. 3 is a schematic view of a waveform diagram of a radar signal emitted by the radar system according to the embodiment of FIG. 1.

FIG. 3 illustrates a non-limiting example of the emitted radar signal 52 as a graph of frequency f versus time t. The emitted radar signal 52 generally includes of a plurality of chirp ramps 54. Each of the plurality of chirp ramps 54 is characterized as a sweep of the frequency f of the emitted radar signal 52 from a first frequency f1 to second frequency f2 during a chirp interval τ which defines a chirp slope S. Each of the plurality of chirp ramps 54 is spaced apart from a prior or subsequent chirp by a silent interval $τ_s$. A sequence of K chirp ramps 54 are emitted over a time interval $t_d$ to form the emitted radar signal, which is sometimes called a Fast Chirp Waveform.

By way of further example and not limitation, suitable values for these variables include in long range object detection mode: a first frequency f1 of 77.55 Giga-Hertz, a second frequency f2 of 77.45 GHz. Such long-range object detection mode parameters results in a bandwidth of 100 Megahertz (MHz), thus a resolution range of 1.5 meter. Suitable values for these variables include in mid-range object detection mode: a first frequency f1 of 77.70 Giga-Hertz, a second frequency f2 of 77.45 GHz. Such mid-range object detection mode parameters results in a bandwidth of 250 MHz, thus a resolution range of 60 centimeters. Suitable values for these variables include in high resolution mode: a first frequency f1 of 81 Giga-Hertz, a second frequency f2 of 77 GHz. Such high-resolution mode parameters results in a ultra wide band modulation (UWB) of a bandwidth of 4 GHz, thus a resolution range of 3.7 centimeters.

Figure 4:
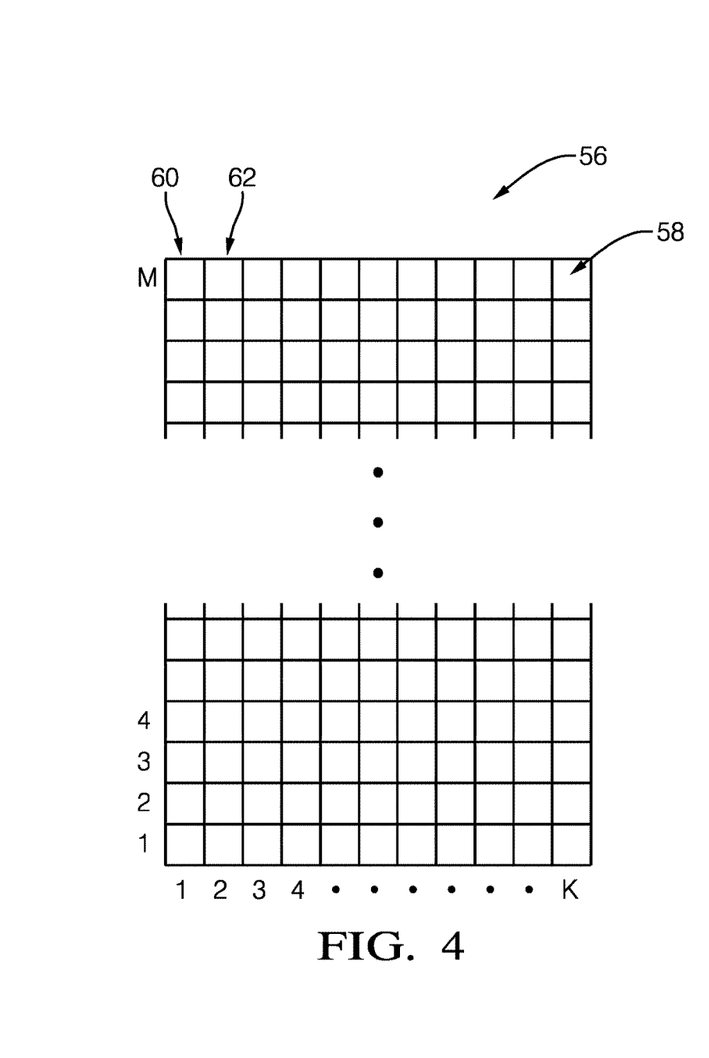
FIG. 4 is a schematic view of a first data array present in the radar system according to the embodiment of FIG. 1.

FIG. 4 illustrates a non-limiting example of a first array of data 56, where each cell 58 of the first array 56 represents a memory location that contains a numerical value indicative of the time-domain signal at the moment it was sampled. The time-domain signal is sampled synchronously with the emitted radar signal 52 so that the reflected signal corresponding to each chirp ramp 54 is sampled a sample count (M) number of times. That is, each cell 58 of the first array is loaded with a numerical value starting at the bottom left corner of the first array 56 and going up the first column 60 until 'M' samples are collected, and then the next column 62 is filled bottom to top. There may be wait time between the 'Mth' sample of one column and the first sample of a subsequent column based on the silent interval (FIG. 3). By way of example and not limitation, a suitable number of samples (i.e. the value of 'M' in FIG. 4) is 1000 samples.

Figure 5:
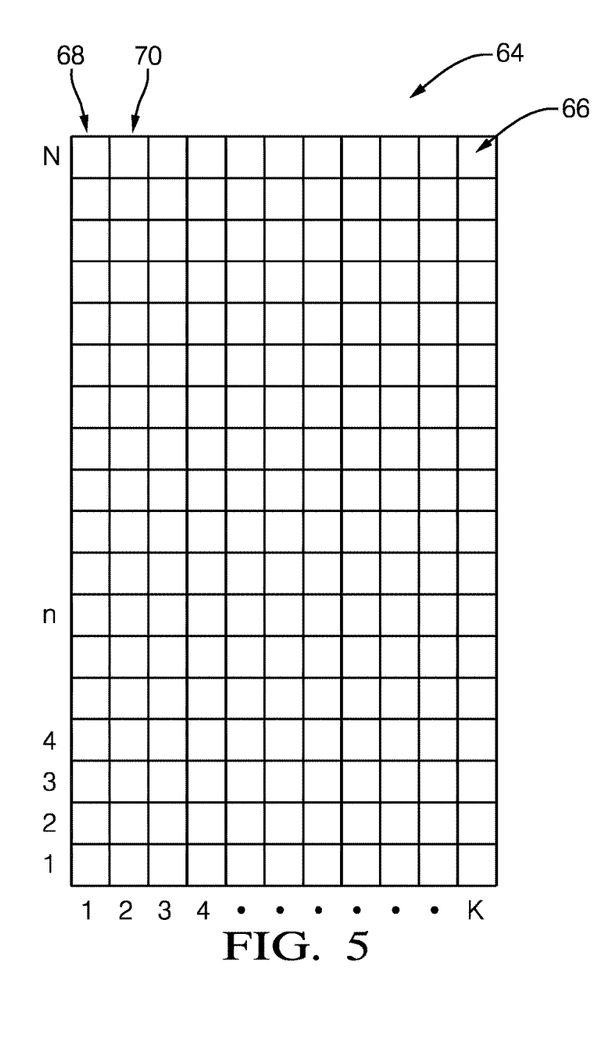
FIG. 5 is a schematic view of a second data array in the radar system corresponding to a Fast Fourier Transformation of the first data array of FIG. 4.

FIG. 5 illustrates a non-limiting example of a second array 64 of data that arises by performing a Fast Fourier Transform (FFT) on data stored in the first array 56, which is sometimes referred to as a Range FFT. Each column 60, 62 of data in the first array 56 represents a time-based sampling of the time-domain signal for duration comparable to the chirp interval τ. The Range FFT transforms the time-based sampling into the range domain so that each cell 66 in the second array 64 contains a numerical value indicative of the magnitude or the amplitude of the reflected radar signal for a particular range bin. As such, the controller 30 is configured to transform the time-domain signal into a plurality of range datasets, wherein each of the range datasets (i.e. each column 68, 70 of the second array 64) corresponds to one of the plurality of chirp ramps 54. That is, each vertical column 68, 70 of the second array 64 is a range dataset that provides an indication of the magnitude or amplitude of the reflected radar signal corresponding to a particular range from the antenna.

Each range dataset (i.e. each column 68, 70) is represented by a series of values, typically complex values, assigned to a plurality of range bins. For example, in a long range object detection mode, the second range bin (row 2) may suitably correspond to a distance or range from the antenna of 1.5 meters, and there may be 150 range bins so the range bin count (i.e. the Nth range bin) may suitably correspond to a distance or range from the antenna of 225 m.

For example, in a mid-range object detection mode, the second range bin (row 2) may suitably correspond to a distance or range from the antenna of 0.6 meters, and there may be 150 range bins so the range bin count (i.e. the Nth range bin) may suitably correspond to a distance or range from the antenna of 90 m.

For example, in a high-resolution mode, the second range bin (row 2) may suitably correspond to a distance or range from the antenna of 3.7 centimeters, and there may be 20 range bins so the range bin count (i.e. the Nth range bin) may suitably correspond to a distance or range from the antenna of 74 centimeters.

There may be data available for distances or ranges greater than the Nth range bin, but that data is discarded and not stored in the second array.

According to the preferred embodiment, for a wide field of view, i.e. per instance +/−75 degrees, generally the distance traveled by the calibration signal 44 or by the first signal 48 from the antenna 24 of the radar system 12 to the rear bumper 14 may vary from less than a few centimeters up to few tenth centimeters. Thus, for the high-resolution mode, the characteristics of the rear bumper 14, i.e. the first return signal 50 or the calibration return signal 46 will be analyzed by the processor 32 for the first n range bins. More particularly, the amplitude of the tenth first range bin (n from 1 to 10) may be considered as the parameter that may be compared between the calibration return signal 46 and the first return signal 50 to determine the relative insertion loss of the rear bumper 14.

In order to exclude conditions that may provide an uncertain result, as per instance if the reflected radar signal is coming from object in direct contact with the part of the rear bumper 14 through which the first signal 48 has been passed, the front of the vehicle 10 may be monitored by a camera. Another solution may be to do an analysis of the amplitude of the range bin from 11 to 20 that may reflect the presence of an undesirable object in direct contact with the rear bumper 14. An amplitude of the tenth first range bin that is greater than a predetermined abnormal amplitude threshold may also be considered as a detection of an object in direct contact with the rear bumper 14 instead of a basic change of the characteristic of the rear bumper 14.

This invention is not limited to the determination of relative transmission loss of a part of a rear bumper 14 passed by radar signal of a radar system 12 placed behind the rear bumper 14. The invention may be extended to the determination of relative insertion loss of any portion of the vehicle 10 passed by a radar signal of a radar system placed behind said portion of the vehicle 10. As non-limited example, the radar system 12 may be located behind the windshield and generally forward of a rearview mirror. The radar system 12 may be positioned to 'look' through a side or rear window of the vehicle 10, or be located proximate to a front bumper of the vehicle 10.

The radar signal is not limited to the radio waves signal in the frequency band of [76-81 GHz], it may be extended to other radar band that may provide enough bandwidth to achieve a desire high resolution mode, depending on the distance from the radar antenna and the portion of the vehicle that is passed by the radar signal. As per example, Radar Band C [4-8 GHz], X [8-12.5 GHz], Ku [12.5-18], K [18-26.5 GHz], Ka [26.5-40 GHz] or millimeter [40-100 GHz] may support the invention.

Figure 6:
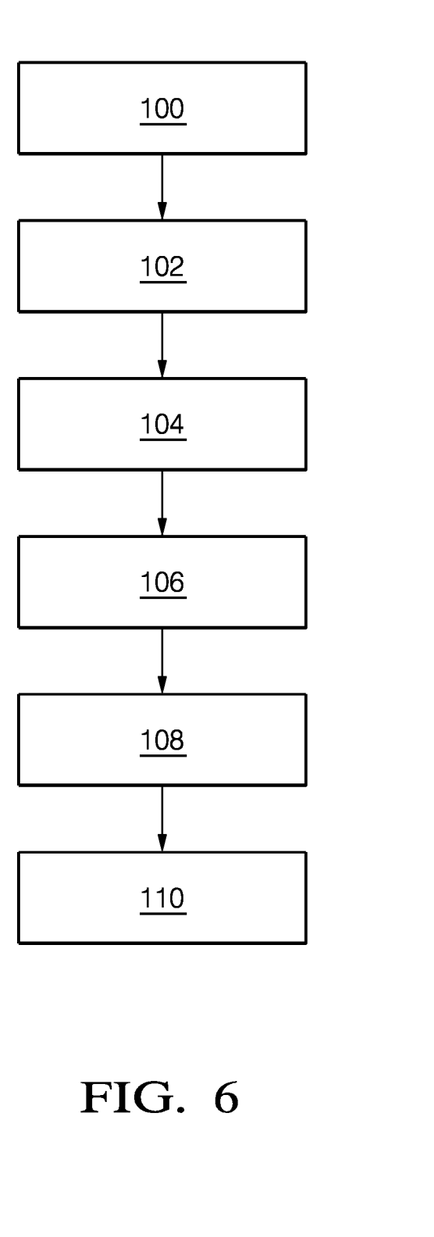
FIG. 6 is a schematic view of a block diagram of a method for monitoring the performance range of the radar system object according to the embodiment of FIG. 1.

In a preferred embodiment, a method for monitoring the performance range of the radar system 12 placed behind a portion of the vehicle, in an operational mode, comprises a step of transmitting 100 the first signal 48 in a high-resolution mode from the radar system 12 through the portion of the vehicle 10. The method comprises a step of receiving 102 the first return signal 50 that comprises a part of the first signal 48 that is reflected by the portion of the vehicle at the antenna 24 of the radar system 12. Then the method comprises a step of measuring 104 the first return signal 50, in particular, the method comprises the step of measuring the first n range bins from the first return signal 50 up to a predetermined maximum distance of the portion of the vehicle 10 from the radar system 12. Then a step of comparing 106 the first return signal 50 with the calibration return 46 signal representative of a part of the calibration signal 44 reflected by the portion of the vehicle in calibration mode is executed. That comparison is made for the first n range bins and more in particular it is a comparison of the amplitude or magnitude of the first n range bin of the first return signal 50 with the calibration return signal 46. Finally, a step of determining 108 the relative loss of transmission of the portion of the vehicle 10 is executed.

In order to inform the vehicle 10 or the driver of the vehicle 10 of a abnormal relative transmission loss of the portion of the vehicle 10 that may affect the radar system 12 performances, a step of triggering 110 an alert is executed.

Figure 7:
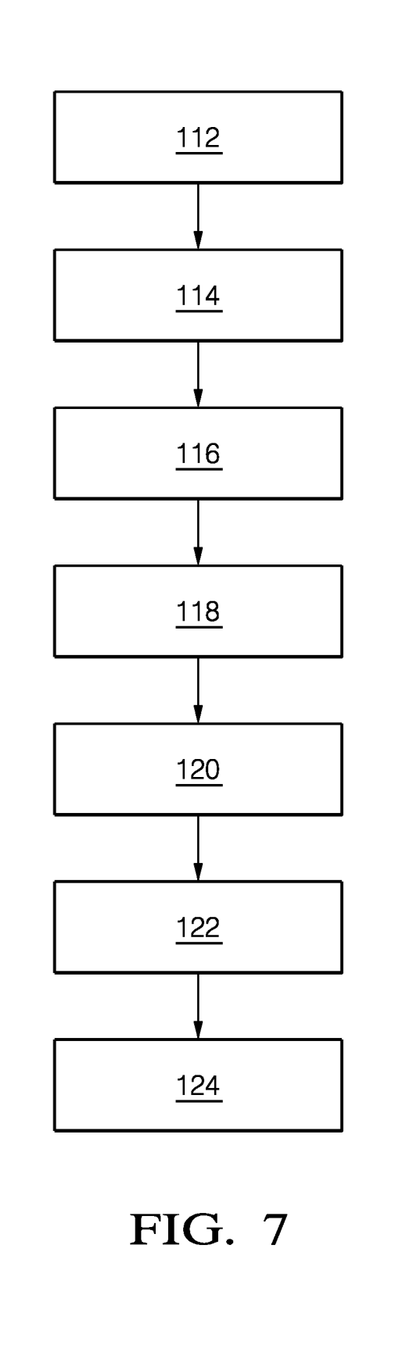
FIG. 7 is a schematic view of a block diagram of the calibration mode of the method of FIG. 6.

In the preferred embodiment, the calibration mode comprises a preliminary step of transmitting 112 the test signal 40 that comprises an object detection signal 22, from the radar system through the portion of the vehicle 10, toward the predetermined object 16 placed at a predetermined distance from the vehicle 10. The calibration mode comprises a step of receiving 114 the test return signal 42 that comprises a part of the test signal 40 reflected by the predetermined object 16 at the antenna 24 of the radar system 12. A step of analyzing 116 the test return signal 42 is executed in order to execute a step of determining 118 if the predetermined object 16 is correctly detected. Then a test of transmitting 120 the first signal 48 in a high-resolution mode from the radar system 12 through the portion of the vehicle 10 only if the predetermined object 16 has been detected is executed. Then a step of receiving 122 the calibration return signal 46 representative of a part of the first signal 48 that is reflected by the portion of the vehicle 10 at the antenna 24 of the radar system 12 is executed. Finally, the calibration return signal 46 is stored 124 in the memory 34 of the controller 30 of the radar system 12 such that the processor 32 is able to calculate the n ranges bins of the calibration return signal 46.

I claim:

1. A method for monitoring a performance range of a radar system placed behind a portion of a vehicle comprising a controller, in an operational mode, configured to perform the method, the method comprising the steps of:
   transmitting, from the radar system and through the portion of the vehicle, a first signal in a high range resolution mode that permits a detection of the portion of the vehicle with a resolution range equal to approximately a distance from the radar system to the portion of the vehicle;
   receiving a first return signal comprising a part of the first signal that is reflected by the portion of the vehicle at the radar system;
   measuring the first return signal;
   comparing the first return signal with a calibration return signal representative of a part of the first signal that is reflected by the portion of the vehicle in a calibration mode;
   determining, from the comparing step, a relative loss of transmission from the portion of the vehicle;
   responsive to the relative loss of transmission being less than a predetermined relative transmission loss threshold, transmitting, from the radar system and through the portion of the vehicle, a second signal in an object detection mode that permits a detection of an object outside the vehicle, the object detection mode a different operation mode of the radar system than the high range resolution mode; and
   receiving a second return signal comprising a part of the second signal that is reflected by the object.

2. The method according to claim 1 characterized in that the step of measuring the first return signal comprises a step of measuring a first n range bins from the first return signal up to a predetermined maximum distance of the portion of the vehicle from the radar system; and the step of comparing comprising a step of comparing the first n range bins with a predetermined first n range bins of the calibration return signal.

3. The method according to claim 2, wherein n is in an interval [1-10].

4. The method according to claim 1, wherein the step of comparing comprises comparing amplitudes of the first return signal with amplitudes of the calibration return signal.

5. The method according to claim 1, said method further comprising, after determining the relative loss of transmission, a step of triggering, by the controller, an alert in the vehicle if the relative loss of transmission has increased more than the predetermined relative transmission loss threshold, the predetermined relative transmission loss threshold corresponding to a minimum guaranteed detection range performance of the radar system placed behind the portion of the vehicle.

6. The method according to claim 1, wherein the operational mode is initiated at each power up of the vehicle.

7. The method according to claim 1, wherein the high range resolution mode includes generating the first signal using ultra-wide band modulation.

8. The method according to claim 1, wherein the first signal is a chirp ramp.

9. The method according to claim 8, wherein the chirp ramp is a chirp ramp of 4 GHz.

10. The method according to claim 1, wherein the first signal is a frequency modulated radio waves signal in a radar band.

11. The method according to claim 10, wherein the radar band is a [77 GHz-81 GHz] radar band.

12. The method according to claim 1, wherein the the method further comprising the steps of:
   transmitting a test signal, comprising an object detection signal, from the radar system through the portion of the vehicle toward a predetermined object placed at a predetermined distance from the vehicle;
   receiving a test return signal comprising a part of the test signal that is reflected by the predetermined object at the radar system;
   analyzing, by the controller, the test return signal;
   determining, by the controller, whether the predetermined object is detected according to the analyzing step;
   responsive to determining that predetermined object is detected, transmitting, from the radar system and through the portion of the vehicle, a calibration signal in the high range resolution mode that permits the detection of the portion of the vehicle;
   receiving a calibration return signal representative of a part of the calibration signal that is reflected by the portion of the vehicle at the radar system; and
   storing, by the controller, the calibration return signal.

13. The method according to claim 12, wherein the test signal is a chirp ramp.

14. The method according to claim 13, wherein the chirp ramp is a chirp ramp up to 400 MHz.

15. An automotive system comprising a vehicle and a radar system placed behind a portion of the vehicle,
   the radar system being configured to detect an object in an outside environment of the vehicle,
   the radar system comprising:
      an antenna configured to detect a reflected signal characterized as a reflection of an emitted signal reflected by the object present in a field-of-view of the antenna; and
      a controller configured to:
         transmit from the radar system and through the portion of the vehicle, a first signal in a high range resolution mode that permits a detection of the portion of the vehicle with a resolution range equal to approximately a distance from the radar system to the portion of the vehicle;
         receive a first return signal comprising a part of the first signal that is reflected by the portion of the vehicle at the radar system;
         measure the first return signal;
         compare the first return signal with a calibration return signal representative of a part of the first signal that is reflected by the portion of the vehicle in a calibration mode;
         determine a relative loss of transmission from the portion of the vehicle;
         responsive to the relative loss of transmission being less than a predetermined relative transmission loss threshold, transmit, from the radar system and through the portion of the vehicle, a second signal in an object detection mode that permits a detection of an object outside the vehicle, the object detection mode a different operation mode of the radar system than the high range resolution mode; and receive a second return signal comprising a part of the second signal that is reflected by the object.

16. The automotive system of claim 15, wherein the controller is configured to:
in measuring the first return signal, measure a first n range bins from the first return signal up to a predetermined maximum distance of the portion of the vehicle from the radar system; and
in comparing the first return signal with the calibration return signal, compare the first n range bins with a predetermined first n range bins of the calibration return signal.

17. The automotive system of claim 16, wherein n is in an interval [1-10].

18. The automotive system of claim 15, wherein the controller is configured to:
in comparing the first return signal with the calibration return signal, compare amplitudes of the first return signal with amplitudes of the calibration return signal.

19. The automotive system of claim 15, wherein the controller is further configured to:
after a determination of the relative loss of transmission, trigger an alert in the vehicle if the relative loss of transmission has increased more than the predetermined relative transmission loss threshold, the predetermined relative transmission loss threshold corresponding to a minimum guaranteed detection range performance of the radar system placed behind the portion of the vehicle.

20. The automotive system of claim 15, wherein the high range resolution mode is initiated at each power up of the vehicle.

* * * * *